(12) United States Patent
Cho

(10) Patent No.: US 11,115,414 B2
(45) Date of Patent: Sep. 7, 2021

(54) ELECTRONIC DEVICE AND CONTROL METHOD THEREOF

(71) Applicant: Samsung Electronics Co., Ltd., Suwon-si (KR)

(72) Inventor: Kyung-sun Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 428 days.

(21) Appl. No.: 15/812,305

(22) Filed: Nov. 14, 2017

(65) Prior Publication Data

US 2018/0176224 A1 Jun. 21, 2018

(30) Foreign Application Priority Data

Dec. 15, 2016 (KR) .................. 10-2016-0171225

(51) Int. Cl.
*H04L 29/06* (2006.01)
*H04W 4/70* (2018.01)
*H04W 12/084* (2021.01)

(52) U.S. Cl.
CPC ............ *H04L 63/10* (2013.01); *H04L 63/101* (2013.01); *H04W 4/70* (2018.02); *H04W 12/084* (2021.01)

(58) Field of Classification Search
None
See application file for complete search history.

(56) References Cited

U.S. PATENT DOCUMENTS

| 7,701,959 | B2 | 4/2010 | Hetzel et al. |
| 9,718,440 | B2 | 8/2017 | Kim et al. |
| 2008/0130854 | A1 | 6/2008 | Kim |
| 2014/0167931 | A1* | 6/2014 | Lee ............... H04L 12/2818 340/12.5 |
| 2015/0007273 | A1 | 1/2015 | Lin |
| 2016/0080890 | A1 | 3/2016 | Shao |
| 2016/0112429 | A1 | 4/2016 | Sundaresan et al. |
| 2016/0173495 | A1* | 6/2016 | Joo ................... H04L 63/08 713/171 |
| 2016/0212137 | A1 | 7/2016 | Pottier et al. |
| 2016/0344593 | A1* | 11/2016 | Ha ..................... H04W 4/70 |
| 2016/0352685 | A1* | 12/2016 | Park ............... H04L 63/0245 |

(Continued)

FOREIGN PATENT DOCUMENTS

| JP | 2016-091167 A | 5/2016 |
| KR | 10-0800693 B1 | 2/2008 |

(Continued)

*Primary Examiner* — Fatoumata Traore
(74) *Attorney, Agent, or Firm* — Jefferson IP Law, LLP

(57) ABSTRACT

A control method for preventing an unnecessary control command from being transmitted to a reception Internet of things (IoT) device in an IoT system, and an electronic device thereof are provided. The control method includes receiving first access control information generated from an external electronic device and storing the first access control information, in response to occurrence of an event for transmitting a first control command to the external electronic device, determining whether the first control command has an authority to control the external electronic device using the first access control information, and, in response to a determination that the first control command has the authority to control the external electronic device, transmitting the first control command to the external electronic device.

13 Claims, 15 Drawing Sheets

(56) References Cited

U.S. PATENT DOCUMENTS

2016/0352732 A1* 12/2016 Bamasag ................ H04L 9/085
2016/0368455 A1   12/2016 Kim et al.
2017/0105171 A1* 4/2017 Srivastava ............ H04L 67/327
2017/0324578 A1   11/2017 Kang et al.

FOREIGN PATENT DOCUMENTS

| KR | 10-1638689 B1 | 7/2016 |
|---|---|---|
| WO | 2015/119417 A1 | 8/2015 |
| WO | 2016/076674 A1 | 5/2016 |

\* cited by examiner

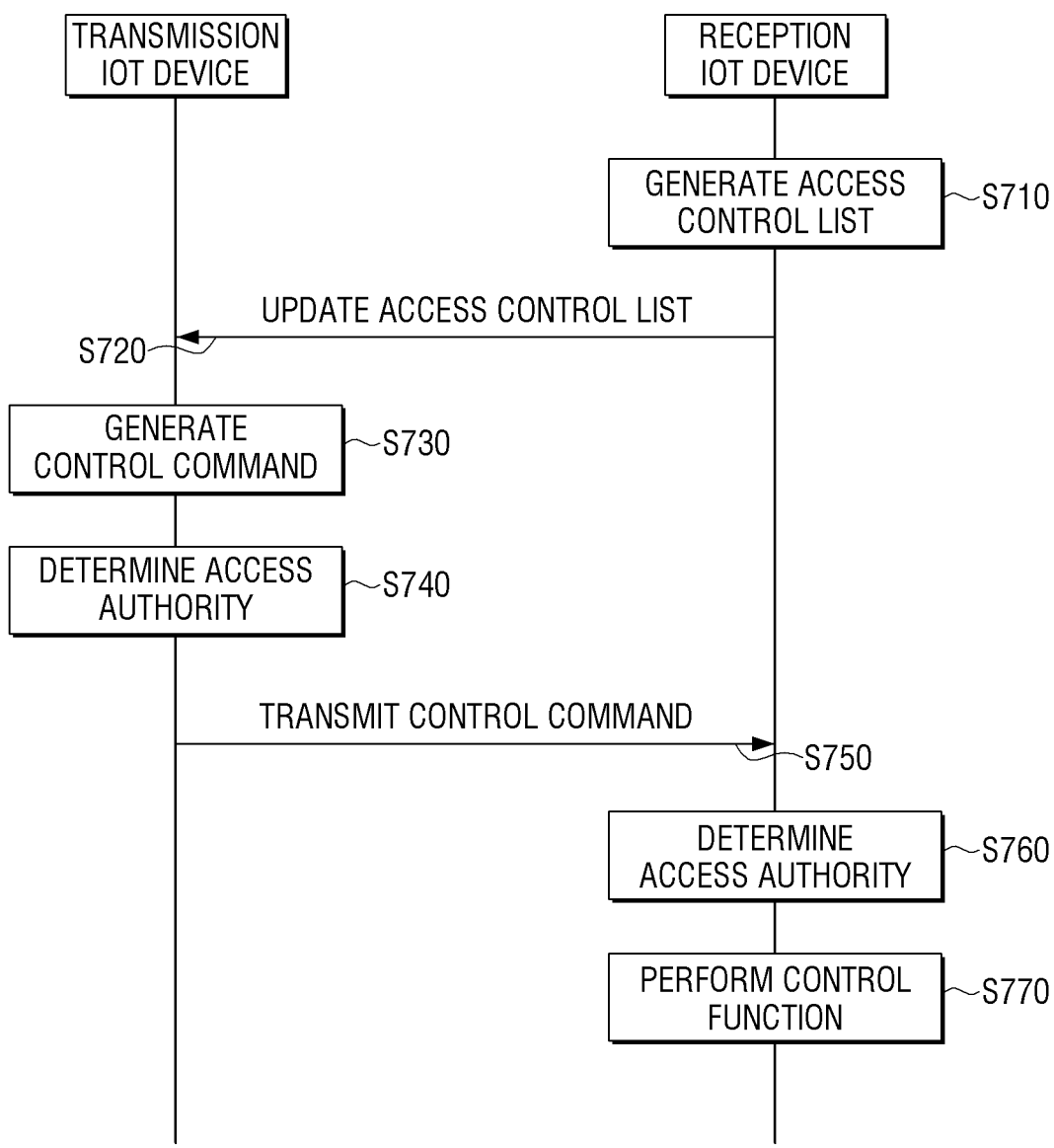

ELECTRONIC DEVICE AND CONTROL METHOD THEREOF

CROSS-REFERENCE TO RELATED APPLICATION(S)

This application claims the benefit under 35 U.S.C. § 119(a) of a Korean patent application filed on Dec. 15, 2016 in the Korean Intellectual Property Office and assigned Serial number 10-2016-0171225, the entire disclosure of which is hereby incorporated by reference.

TECHNICAL FIELD

The present disclosure relates to an electronic device and a control method thereof. More particularly, the present disclosure relates to a method for determining, by a transmission Internet of things (IoT) device, whether a control command generated at the transmission IoT device has authority to access a reception IoT device, thereby preventing an unnecessary control command from being transmitted to the reception IoT device.

BACKGROUND

Internet of things (IoT) refers to technology of interconnecting tangible or intangible objects existing in the world in various methods and providing a new service that cannot be provided by individual objects. Specifically, IoT refers to things provided with communication functions being interconnected through a network, and is increasingly used. In this case, devices operating in the IoT environment may be referred to as IoT devices.

The IoT device may be a smart device such as a smart phone, a digital television (TV), or the like. However, most of the IoT devices may include various devices which are used in everyday life, such as a door lock, a refrigerator, a lamp, or the like. That is, most of the IoT devices may be light/small terminals including only a simple configuration such as a sensor, a low-capacity battery, or the like.

Most of the IoT devices may not be provided with a user interface (UI) which is able to provide a variety of information to users. In this case, users may not use corresponding IoT devices although the IoT devices available to the users exist around the users. Further, batteries provided in most of the IoT devices are low-capacity batteries and there is a problem that users do not know that the batteries are exhausted and the functions of the IoT devices are stopped. In this case, there is a need for a method for saving batteries of light IoT devices.

Since an IoT system consists of various devices, there is a disadvantage that it is easy to access the system from outside. Therefore, there has been many discussions on the security of IoT.

For example, in the case of an Open Connectivity Foundation (OCF)/IoTivity environment, information is secured using channel protection which is security in a network phase and access control security which is security in an application/resource phase.

Specifically, access control in the IoT system is performed at an IoT device which receives a control command That is, an IoT device stores information on other IoT devices that can access the IoT device, and performs a corresponding function in response to only a control command of an IoT device which has authority to access.

In this case, if the IoT device receiving a control command is a light terminal, receiving a control command from an IoT device having no authority to access may cause power waste. For example, a case in which an IoT device receives an unnecessary or malicious control command may be considered. When a user aiming at stopping the function of an IoT device, such as a hacker, transmits a plurality of commands to the IoT device, the IoT device should determine access authority regarding all of the plurality of control commands. That is, the IoT device may have abnormal traffic increasing on a network domain and may be under Dos attacks. In this case, the battery of the IoT device is rapidly consumed and there is also a problem that the function of the IoT device is stopped.

Furthermore, when the above-described problem arises on a home IoT network such as Wi-Fi, a network bandwidth may be degraded and a problem on network performance may arise.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for determining authority to access a reception Internet of things (IoT) device at a transmission IoT device.

In accordance with an aspect of the present disclosure, a control method of an electronic device is provided. the control method includes receiving first access control information generated from an external electronic device and storing the first access control information, in response to occurrence of an event for transmitting a first control command to the external electronic device, determining whether the first control command has authority to control the external electronic device using the first access control information, and, in response to a determination that the first control command has the authority to control the external electronic device, transmitting the first control command to the external electronic device.

The control method may further include, in response to a determination that the first control command does not have the authority to control the external electronic device, deleting the first control command.

The first access control information may include an identification flag for identifying an electronic device which is able to control the external electronic device, and a control flag for controlling the external electronic device.

The determination may include determining whether the electronic device is identical to an electronic device identified by the identification flag, and determining whether the first control command has the authority to control the external electronic device.

The control method may further include, in response to a user request to correct the first access control information or a predetermined time elapsing, receiving corrected first access control information from the first external electronic device and updating the first access control information.

The first control command may include information for determining integrity.

The control method may further include, in response to a determination that the first control command has the authority to control the external electronic device, generating the first control command using the control flag included in the first access control information.

The control method may further include transmitting second access control information to the external electronic device, in response to a second control command being received from the external electronic device, determining whether the second control command has an authority to control the electronic device using the second access control information, and, in response to a determination that the second control command has the authority to control the electronic device, performing a function corresponding to a control flag of the second control command.

In accordance with another aspect of, an electronic device is provided. The electronic device includes a transceiver configured to receive first access control information generated from an external electronic device, a memory configured to store the first access control information received from the external electronic device, and at least one processor configured to in response to occurrence of an event for transmitting a first control command to the external electronic device, determine whether the first control command has an authority to control the external electronic device using the first access control information, and, in response to a determination that the first control command has the authority to control the external electronic device, control the communication unit to transmit the first control command to the external electronic device.

In response to a determination that the first control command does not have the authority to control the external electronic device, the at least one processor may be configured to delete the first control command.

The first access control information may include an identification flag for identifying an electronic device which is able to control the external electronic device, and a control flag for controlling the external electronic device.

The at least one processor may be further configured to determine whether the electronic device is identical to an electronic device identified by the identification flag, and determine whether the first control command has the authority to control the external electronic device.

In response to a user request to correct the first access control information or a predetermined time elapsing, the at least one processor may be further configured to receive corrected first access control information from the first external electronic device, and update the first access control information.

The first control command may include information for determining integrity.

In response to a determination that the first control command has the authority to control the external electronic device, the at least one processor may be further configured to generate the first control command using the control flag included in the first access control information.

The transceiver may be configured to transmit second access control information to the external electronic device, and the at least one processor may be further configured to, in response to a second control command being received from the external electronic device, determine whether the second control command has an authority to control the electronic device using the second access control information, and, in response to a determination that the second control command has the authority to control the electronic device, perform a function corresponding to a control flag of the second control command.

In accordance with another aspect of, a non-transitory computer readable storage medium configured to store one or more computer programs including instructions that, when executed by at least one processor, cause the at least one processor to control for a method for transmitting a control command of an electronic device is provided The control method includes receiving first access control information generated from an external electronic device and storing the first access control information, in response to occurrence of an event for transmitting a first control command to the external electronic device, determining whether the first control command has authority to control the external electronic device using the first access control information, and, in response to a determination that the first control command has the authority to control the external electronic device, transmitting the first control command to the external electronic device.

According to an embodiment described above, the performance of an IoT device can be enhanced by blocking a control command unnecessarily transmitted to a reception IoT device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWING

The above and other aspects, features, and advantages of certain embodiments of the present disclosure will be more apparent from the following description taken in conjunction with the accompanying drawings, in which:

FIG. 7 is a sequence diagram to illustrate functions of the transmission IoT device and the reception IoT device which are illustrated in FIGS. 6A and 6B according to an embodiment of the present disclosure.

Throughout the drawings, it should be noted that like reference numbers are used to depict the same or similar elements, features, and structures.

DETAILED DESCRIPTION

Figure 1:
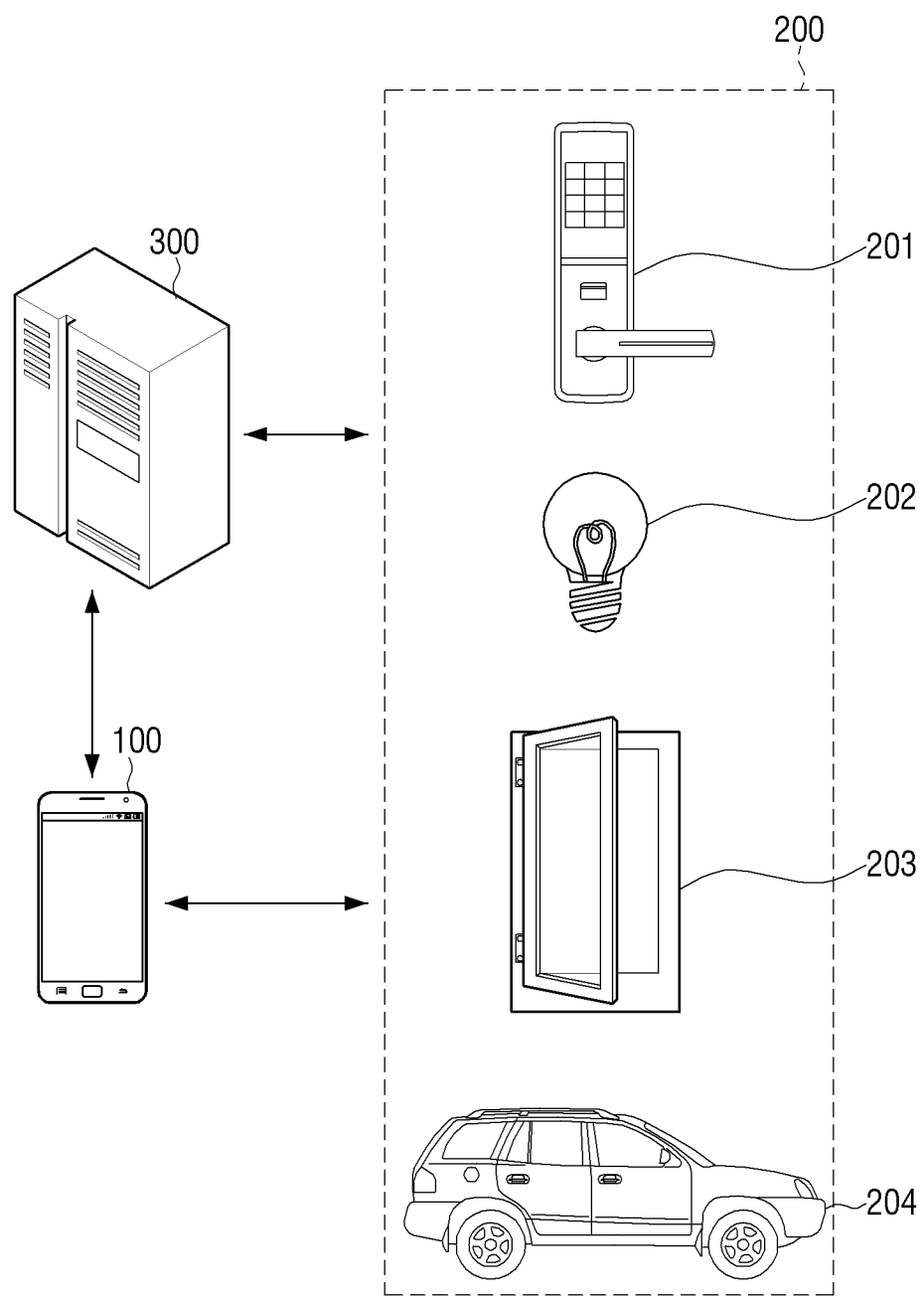
FIG. 1 is a view showing an Internet of things (IoT) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms such as "first" and "second" may be used to explain various elements, and do not limit the corresponding elements. These terms may be used for the purpose of distinguishing one element from another element.

The singular forms are intended to include the plural forms as well, unless the context clearly indicates otherwise. The terms "include" or "is configured" indicate the presence of features, numbers, operations, elements, and components described in the specification, or a combination thereof, and do not preclude the presence or addition of one or more other features, numbers, operation, elements, or components, or a combination thereof.

In addition, a "module" or "unit" used in various embodiments performs one or more functions or operations, and may be implemented by using hardware or software or a combination of hardware and software. In addition, a plurality of "modules" or a plurality of "units" may be integrated into one or more modules, except for a "module" or "unit" which needs to be implemented by specific hardware, and may be implemented as one or more processors.

It will be understood that when an element is "connected with" another element, the element may be "directly connected with" another element, and the element may be "electrically connected with" another element with an intervening element therebetween. In addition, the connection may include physical connection and wireless connection. In addition, when a certain portion "includes" a certain element, it means that the portion may further include other elements rather than excluding other elements unless the context clearly indicates otherwise.

Hereinbelow, various embodiments of the present disclosure will be described in detail with reference to the accompanying drawings, such that an ordinary skilled person in the related art can easily embody the present disclosure. However, the present disclosure may be implemented in various forms and is not limited to the embodiments described herein. In addition, in the drawings, portions having nothing to do with the descriptions are omitted to clearly describe the present disclosure, and similar reference numerals are used for similar portions throughout the specification.

An Internet of things (IoT) device described in the present disclosure may include various types of electronic devices. However, the present disclosure will be described on the assumption that an electronic device is an IoT device for convenience of explanation.

FIG. 1 is a view showing an IoT system according to an embodiment of the present disclosure.

Referring to FIG. 1, the IoT system may include a user terminal device 100, an IoT device(s) 200, and a server network 300. In this case, the user terminal device 100 may also be one of the IoT devices 200.

According to an embodiment, the user terminal device 100 may include at least one of, for example, a smartphone, a tablet personal computer (PC), a mobile phone, a video phone, an e-book reader, a desktop PC, a laptop PC, a netbook computer, a workstation, a personal digital assistant (PDA), a portable multimedia player (PMP), a motion picture experts group (MPEG-1 or MPEG-2) audio layer 3 (MP3) player, a mobile medical device, a camera, or a wearable device. According to various embodiments, the wearable device may include at least one of an accessory type device (for example, a watch, a ring, a bracelet, an ankle bracelet, a necklace, glasses, a contact lens, or a head-mounted device (HMD)), a fabric- or clothing-mounted device (for example, electronic apparels), a body-mounted device (for example, a skin pad, tattoos, etc.), or a bio-implantable device (for example, an implantable circuit).

In addition, according to an embodiment, the IoT device 200 may include various home appliances. The home appliances may include at least one of, for example, smart televisions (TVs), digital versatile disc (DVD) players, audios, refrigerators, air conditioners, cleaners, ovens, microwave ovens, washing machines, air cleaners, set-top boxes, home automation control panels, security control panels, TV boxes (for example, Samsung HomeSync™, Apple TV™, or Google TV™), game consoles (for example, Xbox™ and PlayStation™), electronic dictionaries, electronic keys, camcorders, or electronic picture frames. In addition, the IoT device 200 may include sensors for sensing states in homes. In this case, the sensors may be implemented by using various sensors such as motion sensors, temperature sensors, humidity sensors, illuminance sensors, or the like. However, the IoT device 200 is not limited to the above-described home appliances and may include various types of electronic devices such as boilers, door locks, lamps, monitors, telephones, or the like.

The IoT device 200 may be a low specification IoT device which is provided with a local network communication module. However, the IoT device 200 is not limited to this configuration and may be a high specification IoT device which is provided with a network communication module for performing communication with the server network 300 and the user terminal device 100, a display, or various functions necessary for the IoT device.

The high specification IoT device may be, for example, a refrigerator, a smart TV, a printer, or the like, and the low specification IoT device may be a door lock, a window, a lamp, a cleaner, or the like.

In general, the low specification IoT device may be provided with a small battery. Hereinafter, the present disclosure will be described on the assumption that the IoT device 200 is a low specification IoT device, but this should not be considered as limiting. The IoT device 200 may be a high specification IoT device.

According to an embodiment, the user terminal device 100 may control the IoT system. Specifically, the user terminal device 100 may set connection between the IoT devices 200 and operations thereof. For example, the user terminal device 100 may set the IoT system such that, in response to the door lock 201 being opened, the lamp 202 is turned on. In this case, in response to a sensor of the door lock 201 sensing that the door is opened, the door lock 201 may transmit a control command to the lamp 202 and the lamp 202 may be turned on.

The IoT device 200 may transmit and receive a control command between the IoT devices according to an operation set by the user terminal device 100. In this case, one IoT device 200 may transmit a control command to another IoT device and may receive a control command from still another IoT device 200. In the present disclosure, the IoT device 200 which transmits a control command will be referred to as a transmission IoT device and the IoT device 200 which receives a control command will be referred to as a reception IoT device for convenience of explanation. However, each of the IoT devices 200 may transmit or receive a control command as described above. In the present disclosure, the IoT device 200 refers to a transmission IoT device excepting special cases.

The server network 300 may manage a network among the IoT devices. For example, in response to the transmission IoT device transmitting a control command to the reception IoT device, the control command transmitted by the transmission IoT device may be transmitted to the reception IoT device through the server network 300.

Figure 2A:
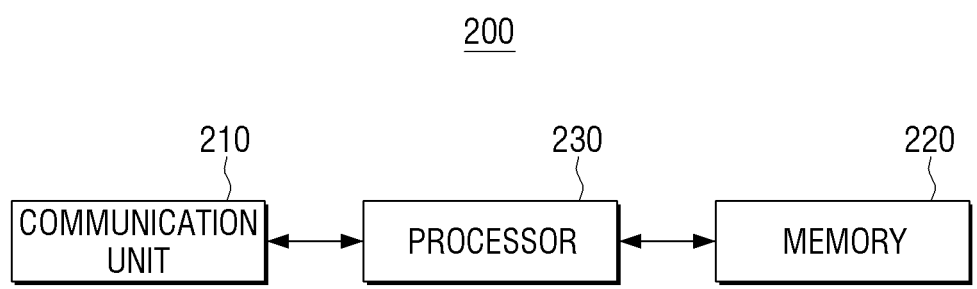
FIGS. 2A and 2B are views showing a configuration of an IoT device 200 according to various embodiments of the present disclosure.
Figure 2B:
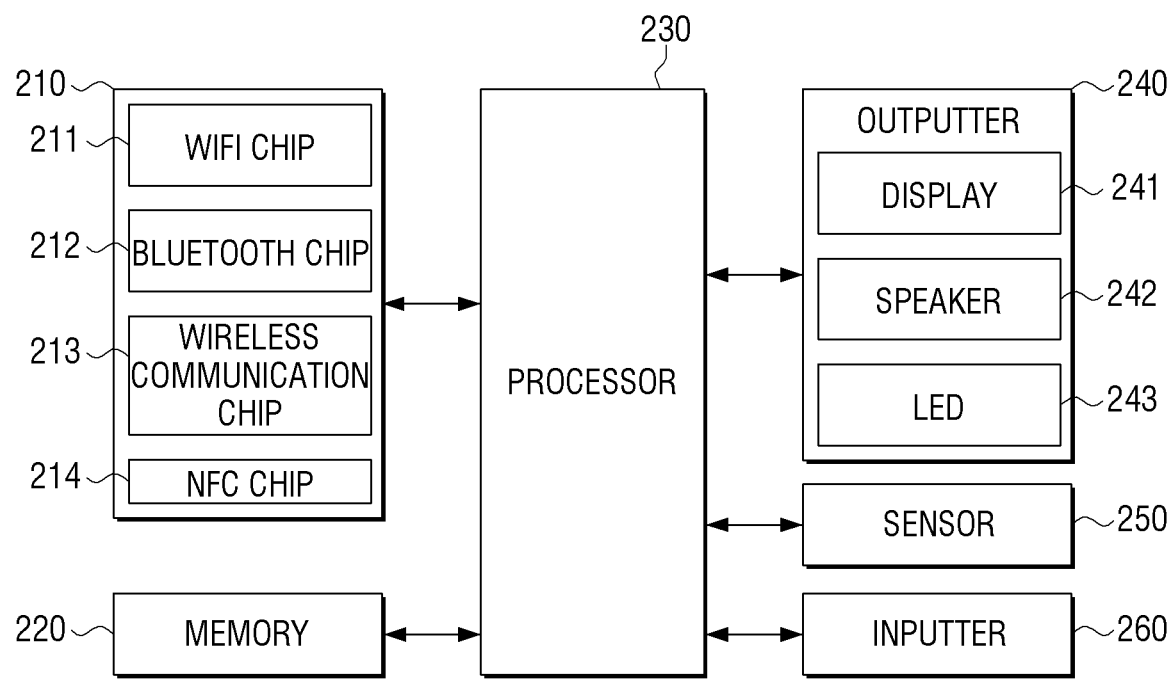

FIGS. 2A and 2B are views showing a configuration of the IoT device 200 according to various embodiments of the present disclosure.

FIG. 2A is a view schematically showing a configuration of the IoT device 200 according to an embodiment of the present disclosure.

Referring to FIG. 2A, the IoT device 200 may include a communication unit 210 (e.g., a transceiver), a memory 220 (e.g., a storage), and a processor 230 (e.g., at least one processor). The communication unit 210 performs communication between the IoT devices 200. Specifically, the communication unit 210 may receive information on an operation from the user terminal device 100, and may transmit and receive a control command or an access control list between other IoT devices 200.

The memory 220 may include the access control list which is received from the reception IoT device 200. In this case, the access control list refers to a list of transmission IoT devices which are allowed to access the reception IoT device. Specifically, in response to the transmission IoT device having no access control authority on the reception IoT device when transmitting a control command, the transmission IoT device may not transmit the control command. In addition, even in response to the control command being transmitted, the reception IoT device may not execute a function corresponding to the received control command.

The processor 230 controls an overall operation of the IoT device 200. In this case, the processor 230 may be implemented in various methods. For example, the processor 230 may be implemented by using at least one of an application specific integrated circuit (ASIC), an embedded processor, a micro-processor, a hardware control logic, a hardware finite state machine (FSM), or a digital signal processor (DSP).

The processor 230 may receive the access control list from the reception IoT device 230 and may store the access control list in the memory 230.

In this case, in response to an event for transmitting a control command to the reception IoT device occurring, the processor 230 may determine whether the control command has authority to control the reception IoT device using the access control list stored in the memory 220.

In this case, the event for transmitting the control command refers to an event which satisfies a condition for generating a control command. For example, the event may be an event in which the door of the door lock 201 is opened, an event in which the window is opened, or a meaningless event which is maliciously generated by a hacker.

In response to it being determined that the generated control command has authority to control the reception IoT device, the processor 230 may control the communication unit 210 to transmit the generated control command to the reception IoT device. On the other hand, in response to it being determined that the control command has no authority to control the reception IoT device, the processor 230 may delete the generated control command from the memory 220.

That is, the access control authority which is determined at the reception IoT device in a related-art method is also determined at the transmission IoT device, such that the processor 230 can prevent unnecessary control information from being transmitted to the reception IoT device. Accordingly, when the reception IoT device is a low-specification/low-power IoT device, battery consumption problems can be solved.

However, the access control authority is not determined only at the transmission IoT device and may be determined once more at the reception IoT device.

The access control information may include an identification flag and a control flag. In this case, the identification flag may be a flag which is used to identify IoT devices having access control authority, and the control flag may be a flag for identifying a function corresponding to a control command. However, the access control information may not only include the identification flag and the control flag described above. In addition, the access control information may include a flag for setting a level of access authority (read (R), write (W), execute (E)), a cycle flag for synchronizing the access control list, or other various configurations.

Specifically, in response to a control command of the IoT device being generated, the processor 230 may determine whether an IoT device identified by the identification flag included in the access control list is identical to the transmission IoT device. That is, in response to the IoT device identified by the identification flag being identical to the transmission IoT device, the processor 230 may determine that the IoT device 200 has access authority, and, in response to the IoT device 200 identified by the identification flag not being identical to the transmission IoT device, the processor 230 may determine that the IoT device 200 has no access authority.

In this case, the control command generated by the processor 230 may include information for determining integrity of the transmission IoT device. For example, the information for determining the integrity may include a secure hash and information on a signature, but is not limited thereto.

The processor 230 may generate the control command and determine whether there exists access control authority. However, this is merely an embodiment and the processor 230 may determine whether the control command has access control authority and then may generate the control command.

In response to the processor 230 determining whether the control command has access control authority and then generating the control command, the generated control command may include a control flag which corresponds to a control command required by the reception IoT device.

In response to a specific event occurring, the IoT device 200 may update the access control list. For example, in response to the access control list of the reception IoT device being corrected or deleted, the processor 230 may update the corrected or deleted access control list. Specifically, in response to the user terminal device 100 changing the connection or operation of the IoT devices 200, the access control list of the reception IoT device may also be corrected or deleted. In this case, the transmission IoT device may be required to update the access control list of the reception IoT device.

The specific event may include not only the event in which the access control list is corrected/changed, but also an event in which there is a user's request or an event in which a predetermined time elapses, and may include various other events.

The above-described embodiment has been described on the assumption that the IoT device 200 is a transmission IoT device. However, the IoT device 200 may be a reception IoT device.

In response to the IoT device 200 being a reception IoT device, the processor 230 may receive a control command from a transmission IoT device through the communication unit 210. In this case, the reception IoT device may determine whether the received control command has access authority.

In response to it being determined that the received control command has access authority, the processor 230 may control the reception IoT device to execute a function corresponding to a control flag included in the control command. For example, in response to the door lock 201 transmitting a control command to turn on light to the lamp 202, the lamp 202 may determine whether the door lock 201 has access authority, and, in response to the door lock 201 having access authority, may be turned on.

The IoT device 200 may receive a control command from an external IoT device. In response to the IoT device 200 receiving a control command of an external IoT device through the communication unit 210, the processor 230 may determine whether the received control command has access authority. In response to it being determined that the control command has access authority, the processor 230 may control the IoT device 200 to execute a function corresponding to the control command.

FIG. 2B is a view showing the configuration of the IoT device 200 in detail according to an embodiment of the present disclosure.

Referring to FIG. 2B, specifically, the IoT device 200 may further include an outputter 240, a sensor 250, and an inputter 260 in addition to the communication unit 210, the memory 220, and the processor 230. However, the IoT device 200 is not limited to this configuration and a new element may be added or some of the elements may be omitted.

The communication unit 210 may include at least one of a Wi-Fi chip 211, a Bluetooth chip 212, a wireless communication chip 213, and a near field communication (NFC) chip 214. In particular, the Wi-Fi chip 211 and the Bluetooth chip 212 may perform communication in a Wi-Fi method and a Bluetooth method, respectively. When the Wi-Fi chip 211 or the Bluetooth chip 212 is used, a variety of connection information such as a service set identifier (SSID) and a session key may be exchanged first, and communication may be established using the connection information, and then a variety of information may be exchanged. The wireless communication chip 213 refers to a chip which performs communication according to various communication standards such as IEEE, Zigbee, $3^{rd}$ generation (3G), $3^{rd}$ generation partnership project (3GPP), long term evolution (LTE), and the like. The NFC chip 214 refers to a chip which operates in an NFC method using a band of 13.56 MHz from among various radio frequency identification (RF-ID) bands such as 135 kHz, 13.56 MHz, 433 MHz, 860-960 MHz, and 2.45 GHz.

Specifically, the communication unit 210 may be configured differently according to whether the IoT device 200 is a low specification IoT device or a high specification IoT device.

The memory 220 may store an operating system (O/S) for driving the IoT device 200. In addition, the memory 220 may store various software programs or applications for operating the IoT device 200 according to various embodiments. The memory 220 may store a variety of information such as various data which are inputted, set, or generated while a program or an application is being executed.

In addition, the memory 220 may include various software modules for operating the IoT device 200 according to various embodiments, and the processor 230 may perform operations of the IoT device 200 according to various embodiments by executing various software modules stored in the memory 220.

To achieve this, the memory 220 may include a semiconductor memory such as a flash memory or a magnetic storage media such as a hard disk.

In addition, the memory 220 may further include a secure module (not shown). The secure module may include an encryption module and a decryption module. The secure module may perform encryption and decryption for security in a network phase, and may include encryption information included in the control command as described above.

The outputter 240 may output various functions which are performed by the IoT device 200. Specifically, the outputter 240 may include a display 241, a speaker 242, or a light emitting diode (LED) 243. However, the outputter 240 is not limited to this configuration and a new element may be added or some of the elements may be omitted.

The display 241 may output image data. The display 241 may display a function which is executed by the processor 230. Specifically, in response to the processor 230 receiving a control command and executing a function corresponding to the control command, the display 241 may display a screen related to the corresponding function.

The speaker 242 may output audio data. The speaker 242 may output not only audio data but also various notification sounds or voice messages.

The LED 243 may be turned on or off according to the control command received at the IoT device 200.

The sensor 250 may sense various types of inputs. Specifically, the sensor 250 may be a touch sensor for sensing a user's touch and may include sensors for sensing various states. For example, the sensor 250 may include various sensors such as a motion sensor, a temperature sensor, a humidity sensor, an illuminance sensor, or the like.

The inputter 260 may receive various types of state information. In addition, the inputter 260 may be coupled to the sensor 250. For example, the sensor 250 and the inputter 260 may be coupled to each other to form a touch sensor. However, the inputter 260 is not limited to this configuration.

FIGS. 3A to 3D are views to illustrate a case in which a transmission IoT device transmits a control command to a reception IoT device according to various embodiments of the present disclosure.

Figure 3A:
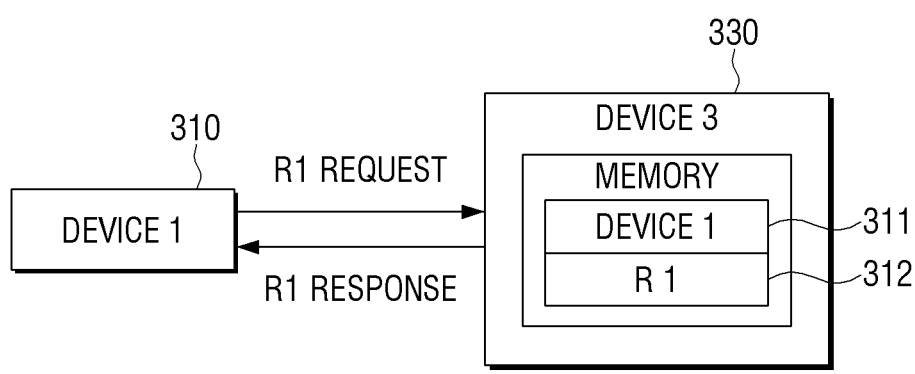
FIGS. 3A, 3B, 3C, and 3D are views showing a case in which a transmission IoT device transmits a control command to a reception IoT device according to various embodiments of the present disclosure.
Figure 3B:
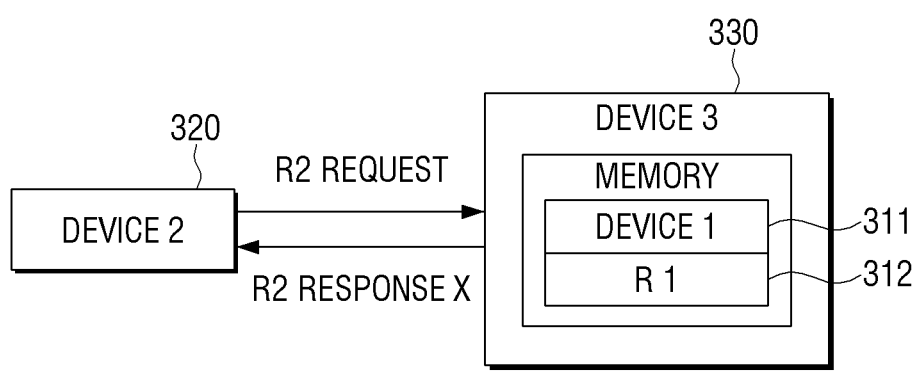

FIGS. 3A and 3B are views to illustrate a case in which a control command is transmitted between related-art IoT devices. Specifically, FIGS. 3A and 3B are views to illustrate a process of determining whether a control command has access authority at a reception IoT device.

Referring to FIG. 3A, a device 1 310 may transmits a control command to request R1 to a device 3 330. In response to the control command being received at the device 3 330, a processor of the device 3 330 determines whether the received control command has access authority. Specifically, the processor determines whether there is an identification flag 311 on the device 1 310 in the access control list of the device 3 330. In response to there being the identification flag on the device 1 310, the processor of the device 3 330 may perform a control function corresponding to a control flag 312 corresponding to R1 requested by the device 1 310.

Referring to FIG. 3B, a device 2 320 may transmit a control command to request R2 to the device 3 330. In response to the control command being received at the device 3 330, the processor of the device 3 330 may determine whether the received control command has access authority as in the case of FIG. 3A. In the case of FIG. 3B, since the device 2 320 has no authority to access the device 3 330, the device 3 330 may not perform a function corresponding to R2.

Referring to FIG. 3B, the device 2 320 may continuously request R2 from the device 3 330. In this case, the device 3 330 may not perform the function corresponding to R2, but may continuously determine whether the control command transmitted by the device 2 320 has access authority. For example, when the device 3 330 is a low specification/low power IoT device, the device 3 330 may consume a battery and may rapidly discharge the battery in response to the request R2 which is meaninglessly repeated.

Figure 3C:
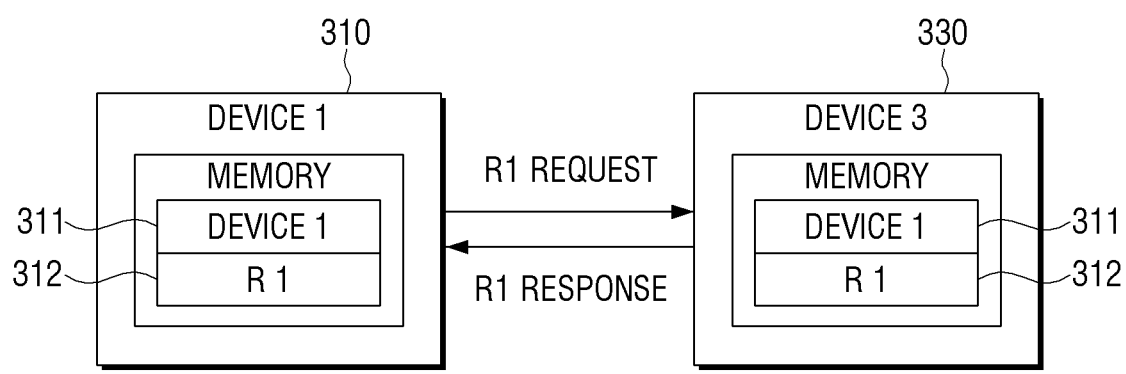
Figure 3D:
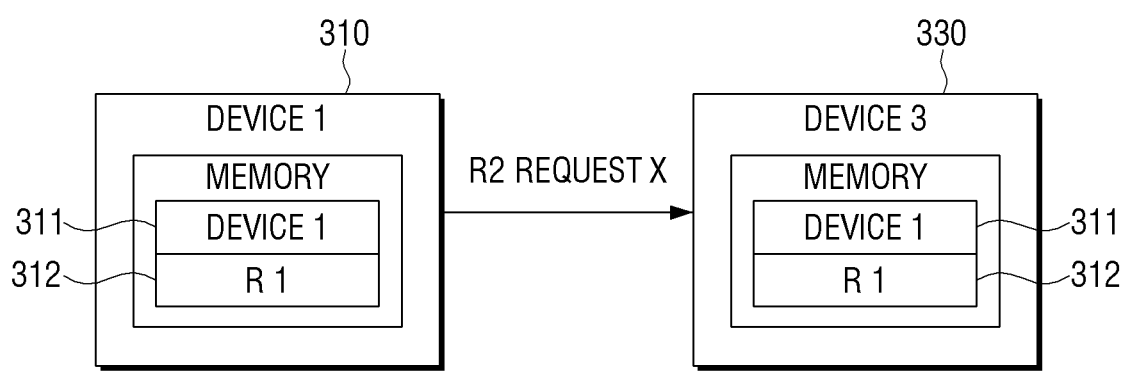

FIGS. 3C and 3D are views to illustrate a case in which a control command is transmitted between IoT devices 200 according to various embodiments.

Unlike in the cases of FIGS. 3A and 3B, the device 1 310 and the device 2 320 have the access control list of the device 3 330. Specifically, the device 1 310 and the device 2 320 should receive the access control list of the device 3 330, first, in order to transmit control commands to the device 3 330.

Referring to FIG. 3C, the device 1 310 may generate a control command to request R1 from the device 3 330. Prior to transmitting the control command to the device 3 330, the device 1 310 may determine whether it has authority to access the device 3 330. In this case, since the device 1 310 has authority to access the device 3 330, the device 1 310 may transmit the control command to the device 3 330.

In response to the control command being received at the device 3 330, the device 3 330 operates as in the case of FIG. 3A. That is, the processor of the device 3 330 determines whether the received control command has access authority. Specifically, the processor determines whether there is the identification flag 311 on the device 1 310 in the access control list of the device 3 330. In response to there being the identification flag on the device 1 310, the processor of the device 3 330 may perform the control function corresponding to the control flag 312 corresponding to R1 requested by the device 1 310.

Referring to FIG. 3D, the device 2 320 may generate a control command to request R2 from the device 3 330. Prior to transmitting the control command to the device 3 330, the device 2 320 may determine whether it has authority to access the device 3 330. In this case, since the device 2 320 has no authority to access the device 3 330, the device 2 320 may not transmit the control command to the device 3 330. Accordingly, in the case of FIG. 3D, the device 3 330 does not receive the control command and thus can reduce unnecessary power consumption.

Although the device 1 310 and the device 3 320 generate the control command and then determine access authority in FIGS. 3C and 3D, the device 1 310 and the device 2 320 may determine access authority prior to generating a control command, and may not generate a control command in response to there being no access authority.

Figure 4A:
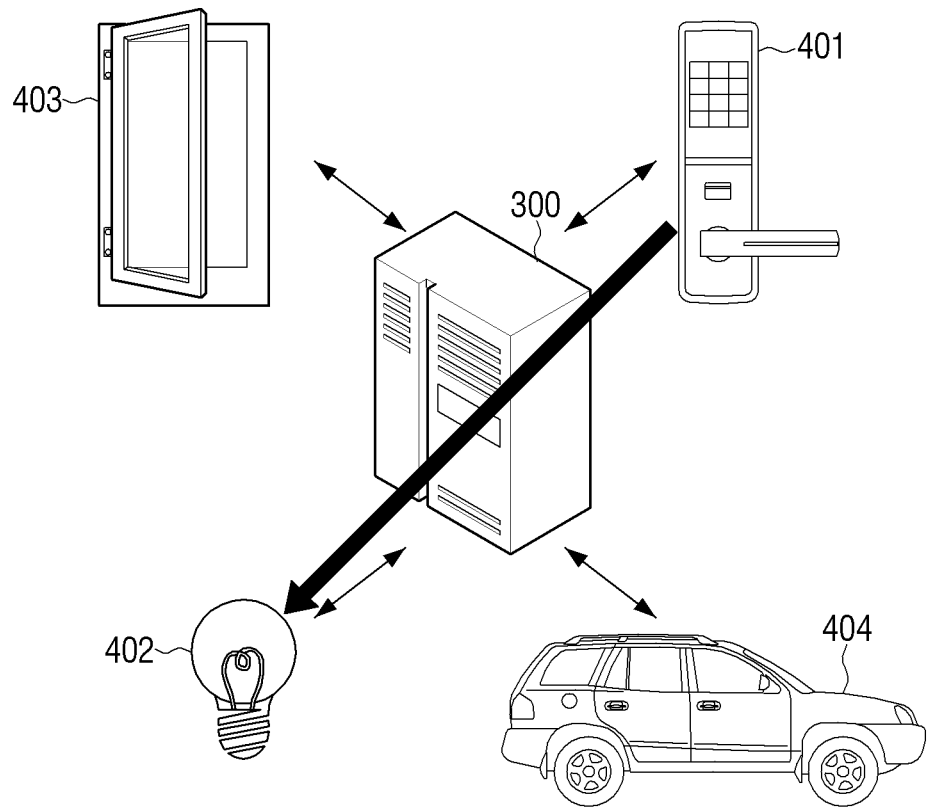
FIG. 4A is a view showing a case in which a transmission IoT device transmits a control command to a reception IoT device according to an embodiment of the present disclosure.
Figure 4B:
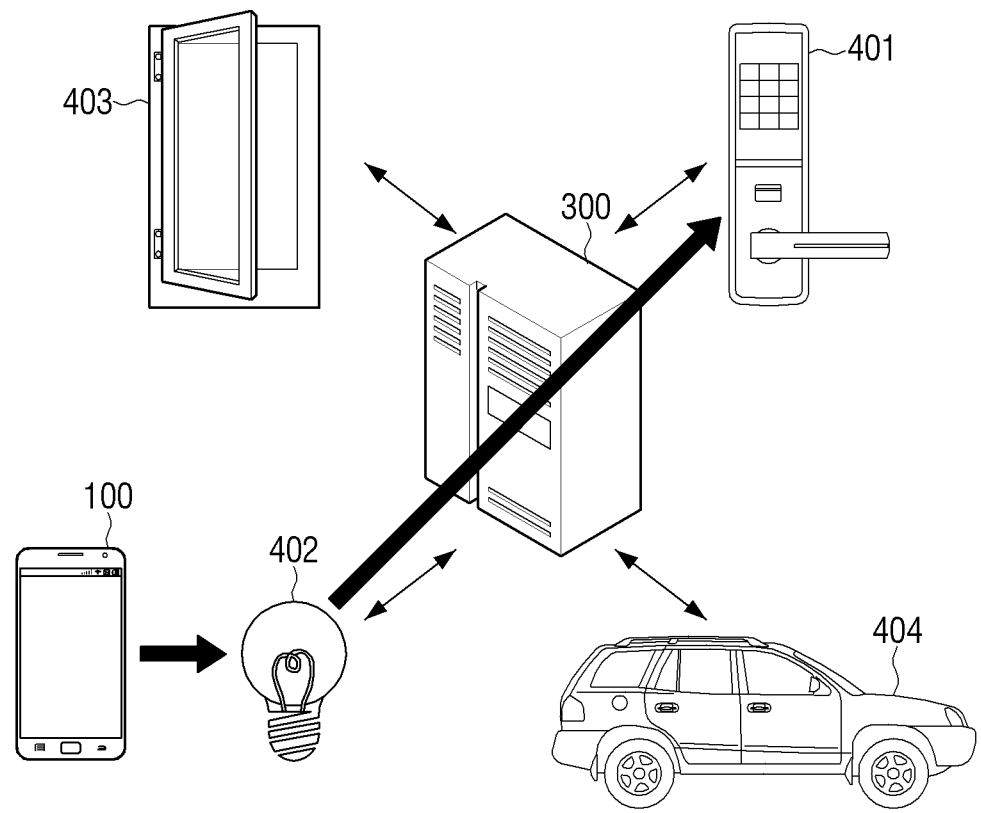
FIG. 4B is a view showing a case in which a transmission IoT device updates an access control list changed at a reception IoT device according to an embodiment of the present disclosure.
Figure 4C:
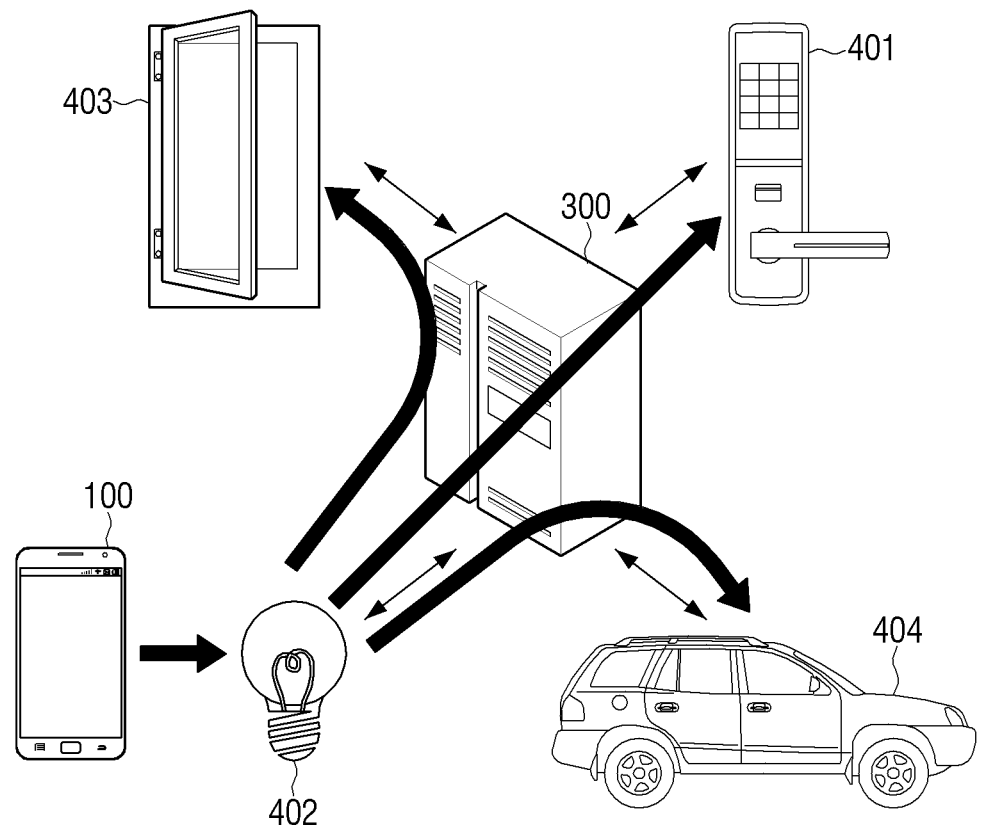
FIG. 4C is a view showing a case in which access control information changed at one reception IoT device is updated at a plurality of transmission IoT devices according to an embodiment of the present disclosure.

FIGS. 4A to 4C are views to illustrate various embodiments the present disclosure.

Referring to FIGS. 4A to 4C, an IoT system may include a door lock 401, a lamp 402, a window 403, a car 404, and a server network 300. However, the IoT system is not limited to this configuration and may include various IoT devices.

Specifically, FIG. 4A is a view showing a case in which a transmission IoT device transmits a control command to a reception IoT device, FIG. 4B is a view showing a case in which a transmission IoT device updates an access control list changed at a reception IoT device, and FIG. 4C is a view showing a case in which access control information changed at one reception IoT device is updated at a plurality of transmission IoT devices.

Referring to FIG. 4A, the door lock 401 may transmit a control command to the lamp 402. Specifically, the door lock 401 may generate a control command for the lamp 402. In response to the control command being generated, the door lock 401 may determine whether the generated control command has authority to access the lamp 402. In response to the control command having no authority to access the lamp 402, the processor 230 may delete the generated control command. In response to the control command having authority to access the lamp 402, the door lock 401 may transmit the control command to the lamp 402 through the server network 300. In this case, the lamp 402 which receives the control command may determine whether the received control command has access authority. In response to it being determined that the control command has no authority to access the lamp 402, the lamp 402 may delete the received control command. In response to the control command having authority to access the lamp 402, the lamp 402 may perform a function corresponding to the control command.

FIGS. 4B and 4C are views to illustrate a process of correcting or deleting access authority information. In response to a specific event occurring, the lamp 402 may correct or change its own access control list. In this case, the specific event may include various events. For example, the user terminal device 100 may request the access control list of the lamp to be corrected or deleted, and may request at a predetermined time.

Specifically, when the user terminal device 100 wishes to correct the access control list of the lamp 402, the user terminal device 100 may request the access control list from the lamp 402. In response to the lamp 402 correcting the access control list, the lamp 402 may generate an access control list to transmit to the door lock 401. The door lock 401 may receive the access control list generated at the lamp 402 and may correct the access control list.

Referring to FIG. 4C, the lamp 402 may transmit the access control list to the window 403 and the car 404 as well as the door lock 401. That is, the reception IoT device may transmit its own access control list to all of the transmission IoT devices which have authority to access the reception IoT device.

Figure 5:
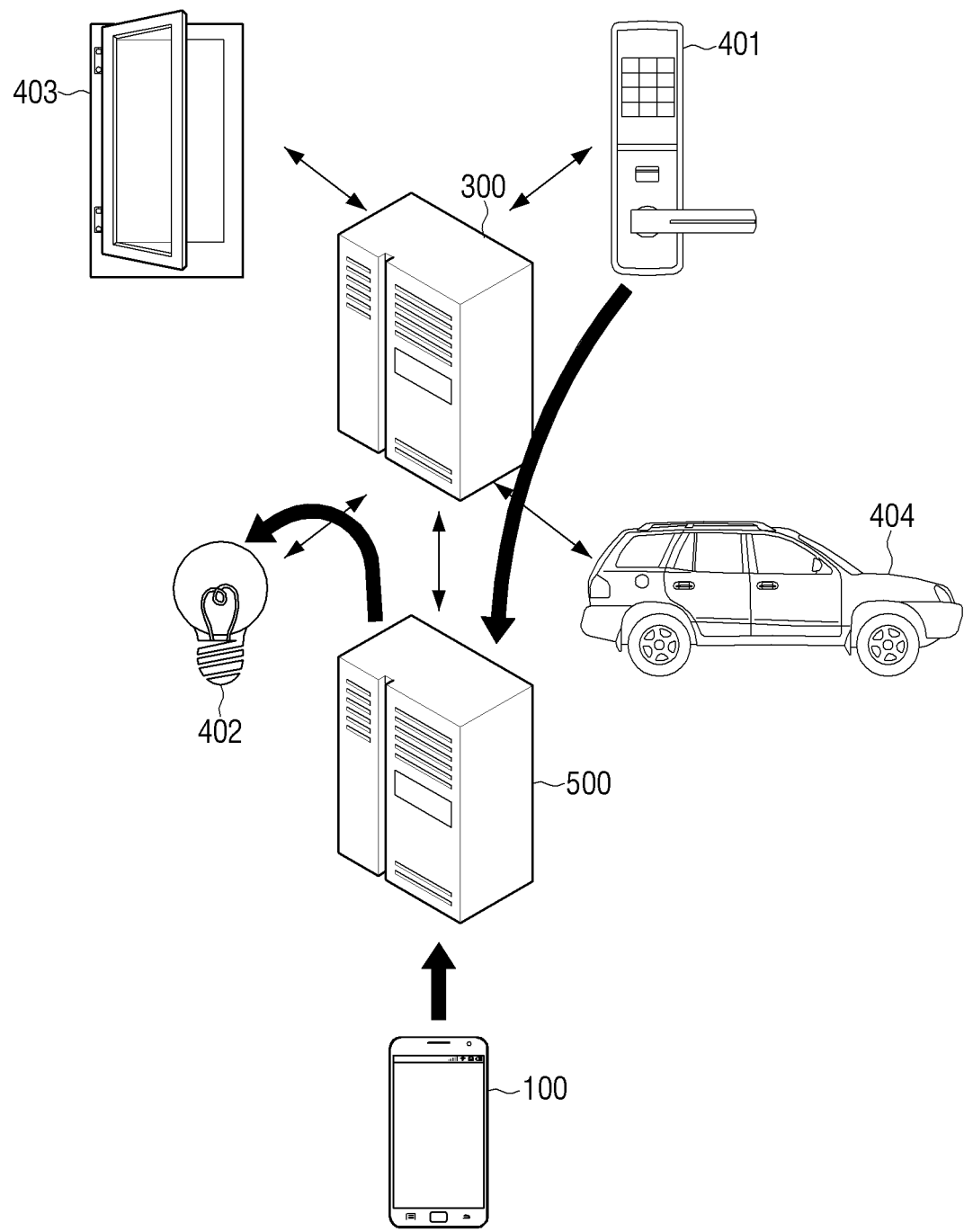
FIG. 5 is a view showing an IoT system according to an embodiment of the present disclosure.

FIG. 5 is a view illustrating an IoT system according to an embodiment of the present disclosure.

Specifically, the IoT system may include the server network 300, the door lock 401, the lamp 402, the window 405, and the car 404, and may further include a security hub 500.

In this case, the security hub 500 may be used to intensively manage the access control lists of the IoT devices. That is, the security hub 500 may be a hub for managing the IoT devices described in FIGS. 4A to 4C.

Referring to FIG. 5, the IoT devices may transmit their respective access control lists to the security hub 500. That is, the security hub 500 may have the access control lists on all of the IoT devices that the security hub 500 manages.

In this case, the door lock 401 may transmit a control command regarding the lamp 402 to the security hub 500. The security hub 500 which receives the control command of the door lock 401 may determine whether the received control command has authority to access the lamp 402. In response to the control command having no authority to access the lamp 402, the processor 230 may delete the generated control command. In response to the control command having authority to access the lamp 402, the security hub 500 may transmit the control command to the lamp 402 through the server network 300. In this case, the lamp 402 which receives the control command may determine whether the received control command has access authority. In response to it being determined that the control command has no authority to access the lamp 402, the lamp 402 may delete the received control command. In response to the control command having authority to access the lamp 402, the lamp 402 may perform a function corresponding to the control command.

In addition, unlike the cases of FIGS. 4B and 4C, the security hub 500 may correct or change the access control list in response to a specific event occurring. For example, when the user terminal device 100 wishes to correct the access control list of the lamp 402, the user terminal device 100 may use the security hub 500. The security hub 500 may generate access control lists regarding all of the transmission IoT device and the reception IoT device and may transmit the access control lists to the transmission IoT device and the reception IoT device.

That is, referring to FIG. 5, the transmission IoT device may not determine whether the control command transmitted thereby has authority to access the reception IoT device, and the security hub 500 may determine whether the control command received from the transmission IoT device has authority to access the reception IoT device. Therefore, when the IoT device 200 is a low specification/low power IoT device, the power consumption of the IoT devices 200 may be reduced by using the security hub 500.

Although the security hub 500 is configured as an independent hub as in the above-described embodiment, the security hub 500 may be configured as a hub device including a security hub and performing various functions. Specifically, the hub device (not shown) may sense the function of the security hub described above and the state of the IoT device 200 such as the door lock 201, the lamp 202, the window 203, and the car 204, and may control the IoT device 200.

Figure 6A:
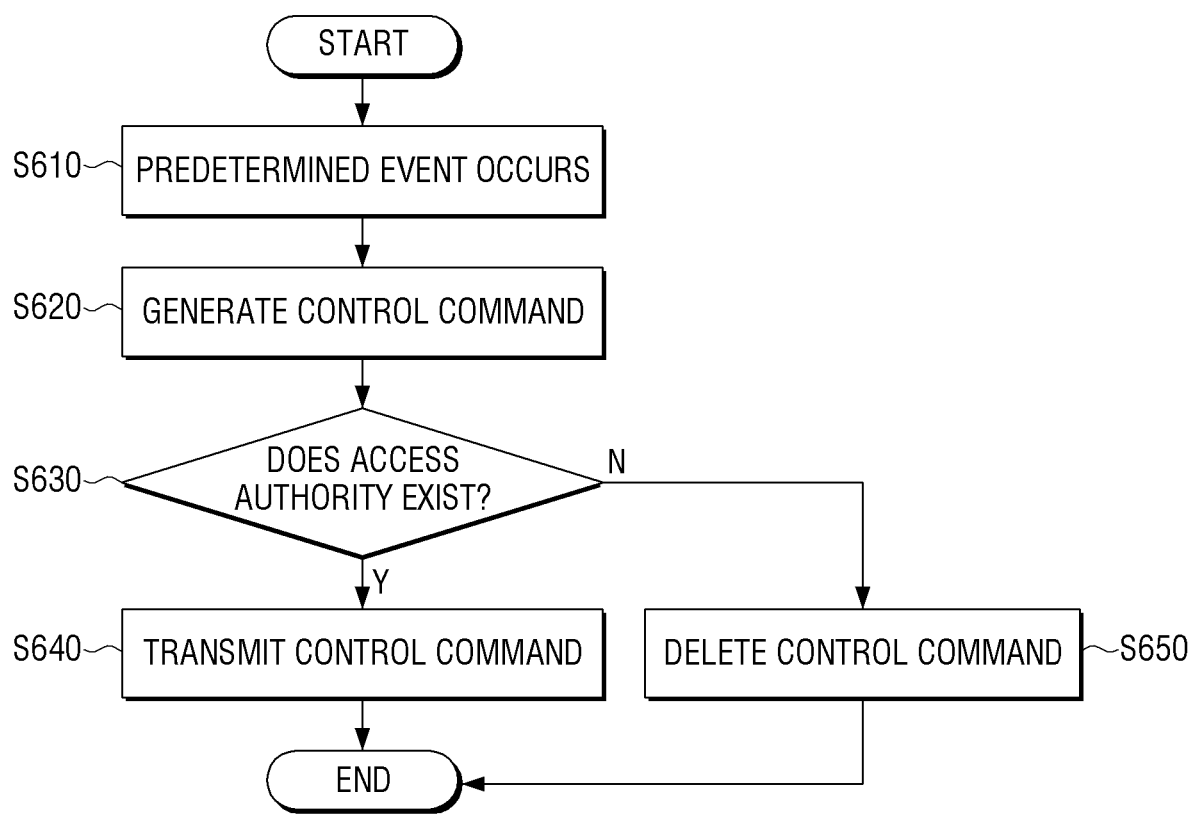
FIGS. 6A and 6B are flowcharts to illustrate an operation of an IoT device according to various embodiments of the present disclosure.
Figure 6B:
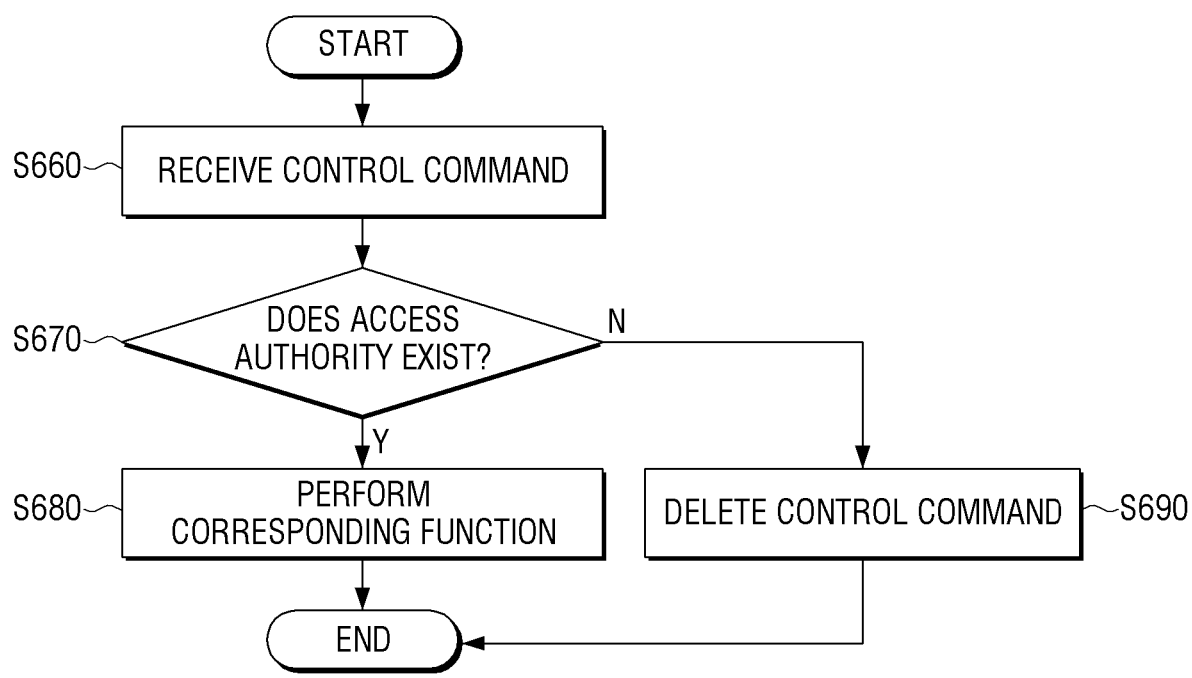

FIGS. 6A and 6B are flowcharts to illustrate an operation of an IoT device according to various embodiment the present disclosure. Specifically, FIG. 6A is a flowchart illustrating an operation of a transmission IoT device, and FIG. 6B is a flowchart illustrating an operation of a reception IoT device.

Referring to FIG. 6A, in response to a predetermined event occurring at operation S610, the processor 230 may generate a control command corresponding to the predetermined event at operation S620. In this case, the predetermined event may be a user's request. In addition, the predetermined event may be a specific action which is pre-set by the user. For example, in response to the lamp 202 being set to be turned on when the door lock 201 is opened, the predetermined event may be an event in which the door lock is opened.

In response to the control command of the transmission IoT device being generated, the processor 230 may determine whether the generated control command has access authority at operation S630. Specifically, the processor 230 may determine whether there is access authority using an identification flag of an access control list which is updated by the reception IoT device and received therefrom. That is, in response to a control device corresponding to the identification flag of the access control list being identical to the transmission IoT device at operation S630-Y (e.g., Yes), the processor 230 may transmit the control command to the reception IoT device through the communication unit 210 at operation S640.

On the other hand, in response to the control device corresponding to the identification flag of the access control list not being identical to the transmission IoT device at operation S630-N (e.g., No), the processor 230 may not transmit the control command and delete the control command at operation S650.

Referring to FIG. 6A, the control command is generated and then it is determined whether the control command has access authority. However, it may be determined whether there is access authority before the control command is generated. In this case, the processor 230 may not generate the control command in response to it being determined that there is no access authority.

FIG. 6B is a flowchart illustrating an operation in response to the reception IoT device receiving a control command.

In response to the reception IoT device receiving a control command at operation S660, the reception IoT device may determine whether the control command has access authority at operation S670. In response to the control device corresponding to the identification flag of the access control list being identical to the transmission IoT device at operation S670-Y (e.g., Yes), the processor 230 may perform a function corresponding to a control flag of the control command at operation S680. For example, in response to a control command generated by the door lock 201 being opened being transmitted to the lamp 202, the lamp 202 may perform "an operation of turning on the lamp" which is a function corresponding to the control flag of the control command transmitted by the door lock 201.

On the other hand, in response to the control device corresponding to the identification flag of the access control list not being identical to the transmission IoT device at operation S670-N (e.g., No), the reception IoT device may delete the received control command at operation S690.

However, the present disclosure is not limited to the above-described embodiment, and, in response to a control command being received, the reception IoT device may not determine access authority and may directly perform a control function. That is, since the received control command is transmitted after it is determined whether there is access authority at the transmission IoT device, the reception IoT device may not determine whether the control command has access authority.

FIG. 7 is a sequence diagram illustrating functions of the transmission IoT device and the reception IoT device described in FIGS. 6A and 6B according to an embodiment of the present disclosure.

In response to there being a user's request, the reception IoT device may generate an access control list at operation S710. In this case, the access control list may be a list of transmission IoT devices which have authority to access the reception IoT device.

In response to the access control list being generated, the reception IoT device may transmit the access control list to the transmission IoT device. Although not shown in FIG. 7, the reception IoT device may transmit the access control list to the transmission IoT device through the server network 300 at operation S720. In addition, although not shown in FIG. 7, the reception IoT device may update the access control list and transmit the access control list to the transmission IoT device in response to a predetermined time elapsing or a predetermined event such as a use's request occurring.

In response to the transmission IoT device generating a control command at operation S730, the processor 230 of the transmission IoT device may determine whether the generated control command has access authority at operation S740. However, as described above, the processor 230 may determine prior to generating the control command.

In response to there being access authority, the processor 230 of the transmission IoT device may transmit the control command to the reception IoT device at operation S750. In response to there being no access authority, the transmission IoT device may not transmit the control command to the reception IoT device and may delete the control command.

In response to the reception IoT device receiving the control command, the reception IoT device may determine whether the control command has access authority once more at operation S760. In response to it being determined that there is access authority, the reception IoT device may perform a function corresponding to the control command at operation S770.

Figure 8:
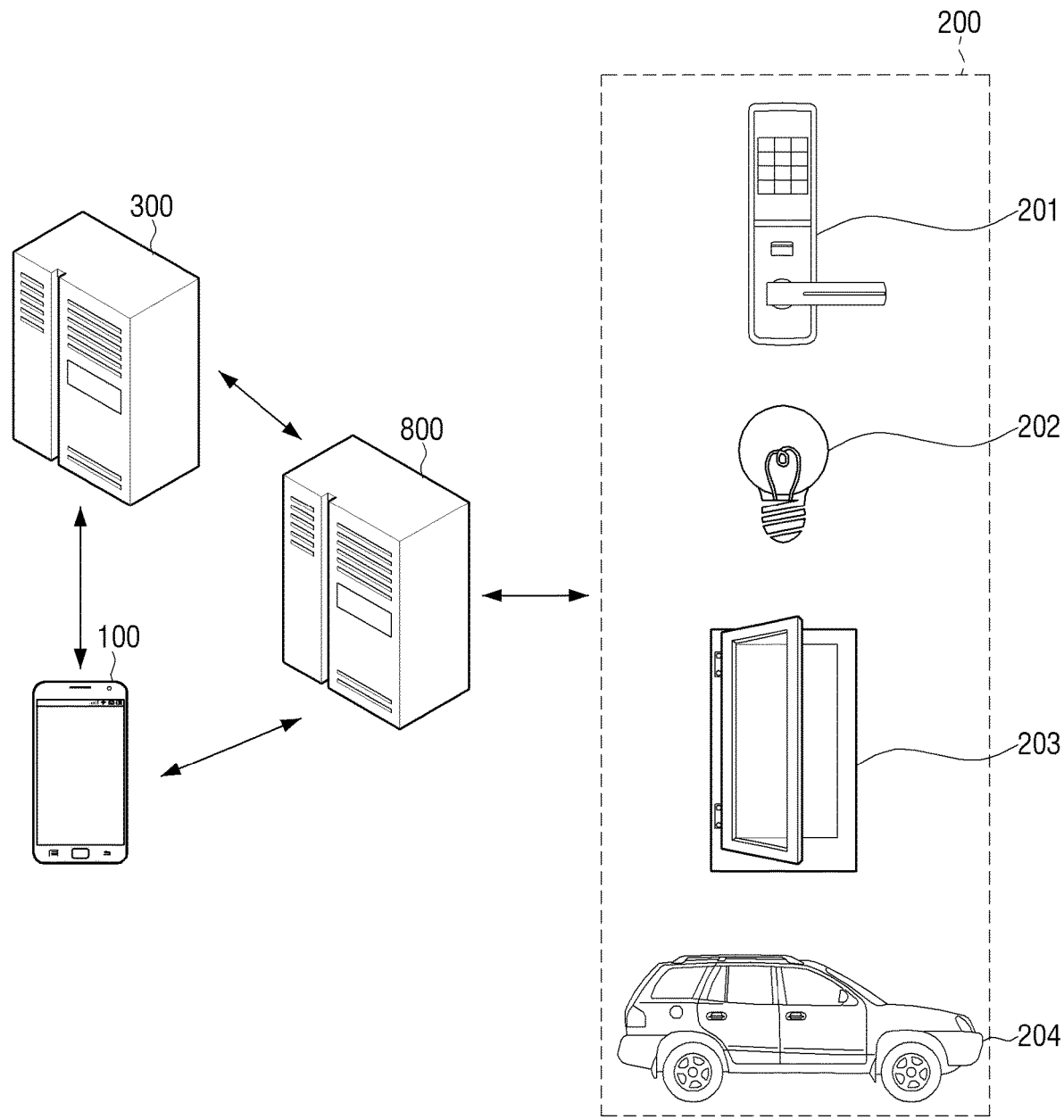
FIG. 8 is a view showing an IoT system according to an embodiment of the present disclosure.

FIG. 8 is a view showing an IoT system according to an embodiment of the present disclosure. FIG. 8 illustrates the transfer of information between the user terminal device 100, the server network 300 and another server network 800, and the transfer of information between the other server network 800 and one or more IoT device(s) 200.

The above-described methods may be implemented in the form of program commands which can be performed through various computing means and may be recorded on a computer-readable medium. The computer-readable medium may include program commands, data files, and data structures either alone or in combination. The program commands recorded on the medium may be those that are especially designed and configured for the present disclosure, or may be those that are publicly known and available to those skilled in the computer software field. Examples of the computer-readable recording medium include magnetic recording media such as hard disks, floppy disks and magnetic tapes, optical recording media such as compact disk-read only memories (CD-ROMs) and DVDs, magneto-optical recording media such as floptical disks, and hardware devices such as read only memories (ROMs), random access memories (RAMs) and flash memories that are especially configured to store and execute program commands. Examples of the program commands include machine language codes created by a compiler, and high-level language codes that can be executed by a computer by using an interpreter. The hardware device may be configured to operate as one or more software modules to perform the operations of the present disclosure, or vice versa.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A control method of an electronic device, the control method comprising:
   receiving first access control information generated from an external electronic device and storing the first access control information;
   in response to an occurrence of an event for transmitting a first control command to the external electronic device, generating the first control command for controlling the external electronic device, and determining whether the first control command has authority to control the external electronic device using the first access control information;
   in response to a determination that the first control command has the authority to control the external electronic device, transmitting the first control command to the external electronic device;
   in response to a determination that the first control command has not the authority to control the external electronic device, ignoring the first control command;
   transmitting second access control information to the external electronic device;
   in response to a second control command being received from the external electronic device, determining whether the second control command has authority to control the electronic device using the second access control information; and
   in response a determination that the second control command has the authority to control the electronic device, performing a function corresponding to a control flag of the second control command;
   wherein the first access control information includes information on an access control list of at least one device which is allowed to access and to control the external electronic device.

2. The control method of claim 1, wherein the first access control information comprises:
   an identification flag for identifying an electronic device which is able to control the external electronic device, and
   a control flag for controlling the external electronic device.

3. The control method of claim 2, wherein the determination comprises:
   determining whether the electronic device is identical to an electronic device identified by the identification flag, and
   determining whether the first control command has the authority to control the external electronic device.

4. The control method of claim 2, further comprising:
   in response to a determination that the first control command has the authority to control the external electronic device, generating the first control command using the control flag included in the first access control information.

5. The control method of claim 1, further comprising:
in response to a user request to correct the first access control information or a predetermined time elapsing, receiving corrected first access control information from a first external electronic device and updating the first access control information.

6. The control method of claim 1, wherein the first control command comprises information for determining integrity.

7. An electronic device comprising:
a transceiver configured to receive first access control information generated from an external electronic device;
a memory configured to store the first access control information received from the external electronic device; and
at least one processor configured to:
in response to an occurrence of an event for transmitting a first control command to the external electronic device, generate the first control command for controlling the external electronic device, and determine whether the first control command has an authority to control the external electronic device using the first access control information,
in response to a determination that the first control command has the authority to control the external electronic device, control a communication unit to transmit the first control command to the external electronic device, and
in response to a determination that the first control command has not the authority to control the external electronic device, ignore the first control command,
wherein the first access control information includes information on an access control list of at least one device which is allowed to access and to control the external electronic device;
wherein the transceiver is configured to transmit second access control information to the external electronic device, and
wherein the at least one processor is further configured to:
in response to a second control command being received from the external electronic device, determine whether the second control command has an authority to control the electronic device using the second access control information, and
in response to a determination that the second control command has the authority to control the electronic device, perform a function corresponding to a control flag of the second control command.

8. The electronic device of claim 7, wherein the first access control information comprises:
an identification flag for identifying an electronic device which is able to control the external electronic device, and
a control flag for controlling the external electronic device.

9. The electronic device of claim 8, wherein the at least one processor is further configured to:

determine whether the electronic device is identical to an electronic device identified by the identification flag, and
determine whether the first control command has the authority to control the external electronic device.

10. The electronic device of claim 8, wherein, in response to a determination that the first control command has the authority to control the external electronic device, the at least one processor is further configured to generate the first control command using the control flag included in the first access control information.

11. The electronic device of claim 7, wherein, in response to a user request to correct the first access control information or a predetermined time elapsing, the at least one processor is further configured to:
receive corrected first access control information from a first external electronic device, and
update the first access control information.

12. The electronic device of claim 7, wherein the first control command comprises information for determining integrity.

13. A non-transitory computer readable storage medium configured to store one or more computer programs including instructions that, when executed by at least one processor, cause the at least one processor to control for a method for transmitting a control command of an electronic device, the method comprising:
receiving first access control information generated from an external electronic device and storing the first access control information;
in response to an occurrence of an event for transmitting a first control command to the external electronic device, generating the first control command for controlling the external electronic device, and determining whether the first control command has authority to control the external electronic device using the first access control information;
in response to a determination that the first control command has the authority to control the external electronic device, transmitting the first control command to the external electronic device;
in response to a determination that the first control command has not the authority to control the external electronic device, ignoring the first control command;
transmitting second access control information to the external electronic device;
in response to a second control command being received from the external electronic device, determining whether the second control command has authority to control the electronic device using the second access control information; and
in response a determination that the second control command has the authority to control the electronic device, performing a function corresponding to a control flag of the second control command,
wherein the first access control information includes information on an access control list of at least one device which is allowed to access and to control the external electronic device.

* * * * *